(12) United States Patent
Brown et al.

(10) Patent No.: US 8,294,990 B2
(45) Date of Patent: Oct. 23, 2012

(54) METHOD AND APPARATUS FOR OPTICAL FILTERING WITH TWO PASSBANDS

(75) Inventors: Douglas J. Brown, Midland (CA);
Daniel B. Mitchell, Port McNicoll (CA);
Geoffrey G. Harris, Midland (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 515 days.

(21) Appl. No.: 12/554,240

(22) Filed: Sep. 4, 2009

(65) Prior Publication Data

US 2011/0058256 A1      Mar. 10, 2011

(51) Int. Cl.
*G02B 27/00*      (2006.01)
*G02B 5/28*      (2006.01)

(52) U.S. Cl. .......................... 359/578; 359/589

(58) Field of Classification Search .......... 359/577–590;
356/317, 417–419; 250/458.1–461.2;
422/82.07–82.08
See application file for complete search history.

(56) References Cited

U.S. PATENT DOCUMENTS

| | | | |
|---|---|---|---|
| 5,625,494 A * | 4/1997 | Fukushima | 359/634 |
| 6,118,912 A | 9/2000 | Xu | |
| 6,636,357 B2 | 10/2003 | Robins et al. | |
| 6,700,690 B1 * | 3/2004 | Buchsbaum et al. | 359/230 |
| 6,928,210 B2 | 8/2005 | Kropp | |
| 7,079,322 B2 | 7/2006 | Minakawa et al. | |
| 7,215,885 B2 | 5/2007 | Yamane et al. | |
| 7,477,392 B2 | 1/2009 | Leidecker et al. | |
| 7,616,845 B2 | 11/2009 | Matsuoka et al. | |
| 2002/0140935 A1 * | 10/2002 | Carter | 356/419 |
| 2010/0046076 A1 * | 2/2010 | Feke et al. | 359/578 |

OTHER PUBLICATIONS

U.S. Appl. No. 12/169,808, filed Jul. 9, 2008 by inventors Douglas J. Brown, Daniel B. Mitchell, Geoffrey G. Harris, William Conrad Stenton, and Gerard M. Desroches for "Method and Apparatus for Optical Bandpass Filtering, and Varying the Filter Bandwidth", 24 pages of text, 4 pages of drawings.
U.S. Appl. No. 12/363,527, filed Jan. 30, 2009 by inventors Douglas J. Brown, Daniel B. Mitchell, Geoffrey G. Harris, Gerard M. Desroches, William Conrad Stenton for "Method and Apparatus for Optical Bandpass and Notch Filtering, and Varying the Filter Center Wavelength", 25 pages of text, 12 pages of drawings.
Notice of Allowance mailed May 14, 2010 in U.S. Appl. No. 12/169,808, filed Jul. 9, 2008.

* cited by examiner

*Primary Examiner* — Stephone Allen
*Assistant Examiner* — Kimberly N Kakalec
(74) *Attorney, Agent, or Firm* — Lando & Anastasi, LLP

(57) ABSTRACT

An apparatus includes an optical filter having first and second passbands that are different, the optical filter including selectively operable first passband adjusting structure that varies a characteristic of the first passband without influencing the second passband. According to a different aspect, a method includes filtering radiation with an optical filter having first and second passbands that are different, and selectively varying a characteristic of the first passband without influencing the second passband.

20 Claims, 6 Drawing Sheets

METHOD AND APPARATUS FOR OPTICAL FILTERING WITH TWO PASSBANDS

FIELD OF THE INVENTION

This invention relates in general to filtering techniques and, more particularly, to optical filtering techniques.

BACKGROUND

There are applications for which it is desirable to have an optical bandpass filter with two distinct passbands. One approach would be to fabricate a multi-layer coating that has two separate passbands. But as a practical matter, it can be difficult to actually manufacture such a coating with two separate passbands that each have the desired frequency range. Further, the spacing between the passbands becomes fixed at the time of manufacture. In addition, although the filter can be tilted from normal incidence in order to achieve a degree of tuning, this causes both passbands to move simultaneously toward shorter wavelengths. It is not possible to significantly vary the center wavelength of one passband without affecting the other passband, nor is it possible to vary the bandwidth of either passband. Thus, although existing dual-passband optical filters have been generally adequate for their intended purposes, they have not been entirely satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
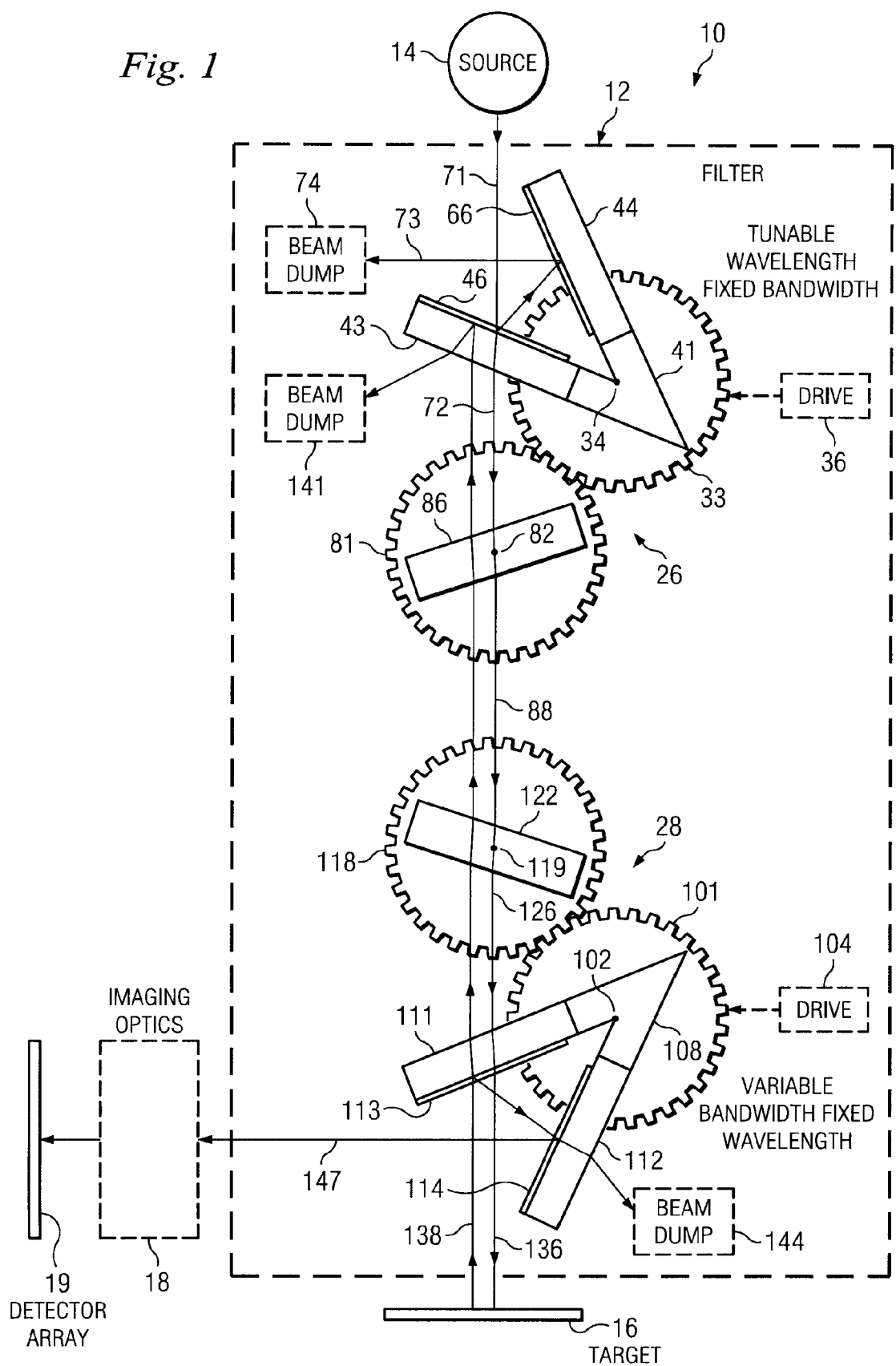
FIG. 1 is a diagrammatic view of an apparatus that is part of a fluorescence microscope, and that includes a dual-passband optical filter embodying aspects of the invention.

FIG. 1 is a diagrammatic view of an apparatus 10 that is part of a fluorescence microscope, and that includes a dual-passband optical filter 12 embodying aspects of the invention. A source 14 of a known type emits a broadband beam within a selected waveband, and this radiation is filtered by the filter 12 in a manner discussed in more detail later. The filtered radiation from the source 14 is ultimately directed by the filter 12 to a specimen or target 16 that has been treated with a conventional fluorescent dye. This radiation causes the dye in the target 16 to fluoresce, and to emit radiation at a wavelength different from the wavelength of the radiation received through the filter 12 from the source 14. Radiation emitted due to the fluorescence is filtered by the filter 12 in a manner discussed in more detail later, and then directed through imaging optics 18 of a known type to a detector array 19 of a known type.

The optical filter 12 includes two cascaded optical filter sections 26 and 28 that operate independently. The optical filter section 26 includes a gear 33 that is supported for limited rotational movement about a pivot axis 34. A drive mechanism 36 is provided to selectively pivot the gear 33. In the disclosed embodiment, the drive mechanism 36 includes a not-illustrated stepper motor having a rotatable shaft with a not-illustrated pinion gear thereon, the pinion gear engaging the teeth of the gear 33. The drive mechanism 36 includes two not-illustrated switches that can be manually actuated to cause the stepper motor to rotate its shaft in either of two opposite directions, and thus pivot the gear 33 in either one direction or the other. The drive mechanism 36 could, however, have some other configuration. In FIG. 1, the gear 33 is shown in a center position. The drive mechanism 36 can selectively pivot the gear 33 a few degrees away from the illustrated center position about the axis 34, in either of two opposite rotational directions. The drive mechanism 36 can also releasably maintain the gear 33 in any angular position.

A V-shaped support member 41 is fixedly secured on the gear 33 for pivotal movement therewith. Two substrates 43 and 44 each have one end fixedly but detachably secured to a respective leg of the V-shaped support member 41. The facing surfaces of the substrates 43 and 44 extend at an angle of approximately 45° with respect to each other, and intersect at a line that is coincident with the axis 34.

Figure 2:
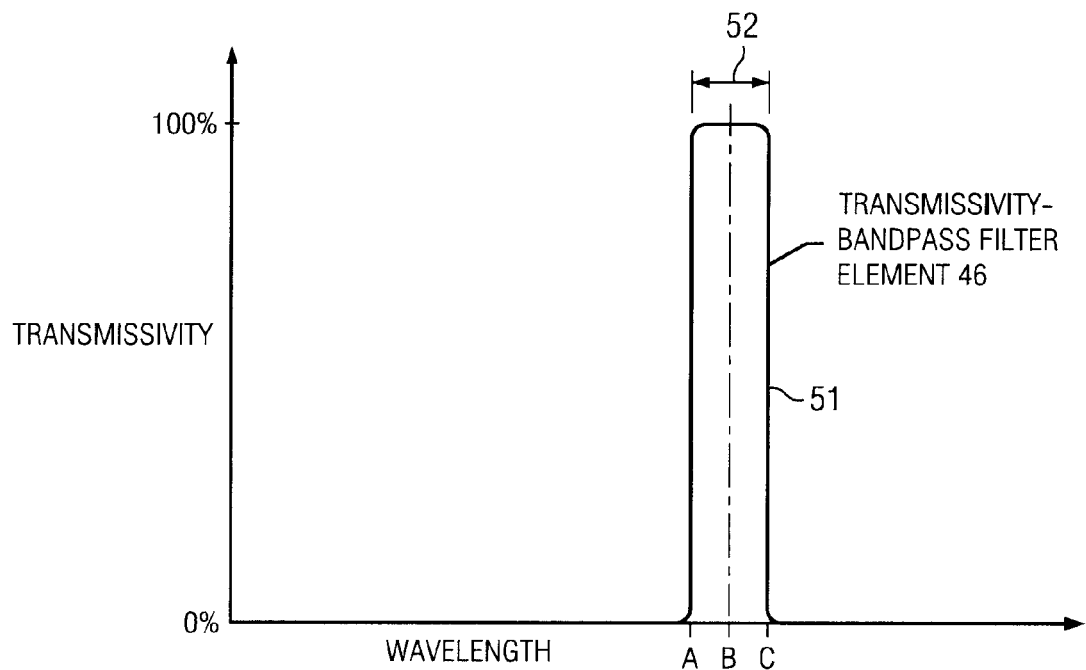
FIG. 2 is a graph showing a curve that represents the transmissivity of a bandpass filter element that is a component of the embodiment of FIG. 1.

A bandpass filter element 46 is provided on the surface of substrate 43 that faces the substrate 44. The bandpass filter element 46 is a multi-layer filter coating of a known type, and in particular a multi-cavity Fabry-Perot structure, but it could alternatively have some other suitable structure. The filter element 46 is transmissive to radiation inside a passband having a center wavelength, and is reflective to radiation above and below this passband. FIG. 2 is a graph of a curve 51 representing the transmissivity of the filter element 46 of FIG. 1 with respect to radiation arriving from the source 14, when the gear 33 is in the center position shown in FIG. 1. For clarity, the curve 51 in FIG. 2 has a somewhat idealized shape. When the gear 33 and the filter element 46 are in the center position, the filter element 46 has a passband that is between two wavelengths A and C, and has a bandwidth 52 and a center wavelength B. The filter element 46 is transmissive to radiation within the passband (between wavelengths A and C), and reflective to wavelengths above or below the passband.

Figure 3:
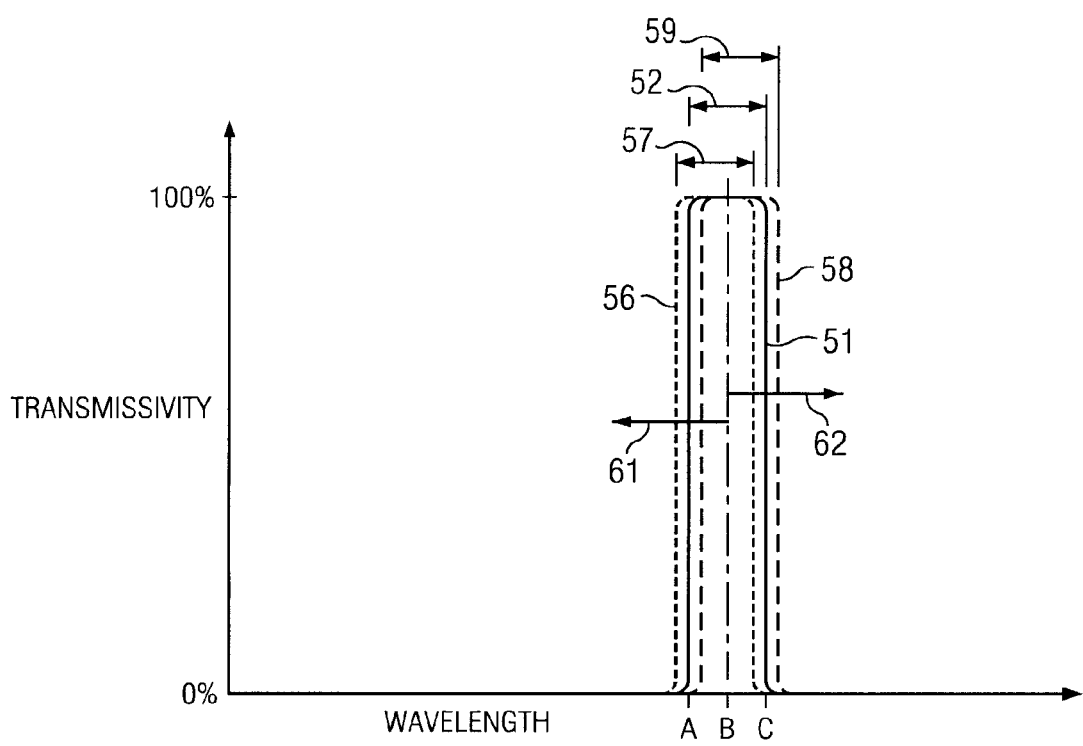
FIG. 3 is a graph similar to FIG. 2, but also showing in broken lines two additional curves that represent shifted positions of a passband caused by tilting movement of the bandpass filter element.

When the gear 33 and filter element 46 are in the center position of FIG. 1, the beam of radiation from the source 14 propagates along a path of travel 71 and then impinges on the filter element 46 at an angle of approximately 22.5° with respect to a not-illustrated reference line perpendicular to the filter element 46. If the gear 33 and filter element 46 are pivoted away from the center position of FIG. 1 in either direction, there will be a change in the angle at which radiation from the source 14 impinges on the filter element 46. As a result, the entire passband will move leftwardly or rightwardly in FIG. 2, without any significant change in the bandwidth 52. This means that the center wavelength will either increase or decrease by the same amount. FIG. 3 is a graph that is similar to FIG. 2, but that also shows in broken lines two curves 56 and 58 that represent shifted positions of the passband 51 caused by limited pivotal movement of the gear 33 away from the center position in respective directions that are opposite. The curves 56 and 58 have respective bandwidths 57 and 59 that are each approximately equal to the bandwidth 52. When the passband shifts from 51 to 56 or 58, the center wavelength also increases or decreases from wavelength B, as indicated diagrammatically by arrows 61 and 62 in FIG. 3. The curves 56 and 58 in FIG. 3 each represent a small and exemplary amount of shift of the passband 51 in each direction, but do not represent upper and lower limits on the shifting of passband 51. The passband 51 can in fact be shifted significantly farther in either direction.

A reflective element 66 is provided on the surface of the substrate 44 that faces the substrate 43. In the disclosed embodiment, the reflective element 66 is a mirror coating of a known type that has a multi-layer design utilizing multiple dielectric materials. Alternatively, however, the coating 66 could be made from any other suitable material or combination of materials, and could for example be made from a metallic material. The reflective element 66 is reflective to all wavelengths within the operating range of the optical filter section 26. Wavelengths that are emitted by the source 14 and that are outside the current passband of the filter element 46 are reflected by the filter element 46, then travel to and are reflected by the reflective element 66, and then propagate along a path of travel 73 to an optical beam dump 74 of a known type. The geometry of the optical filter section 26 is such that, as the filter element 46 and reflective element 66 rotate with the gear 33, the path of travel 73 does not move.

The substrate 43 is made of a material that is transmissive to all wavelengths within all possible wavelength ranges of the passband of the filter element 46. Wavelengths emitted by the source 14 that are within the current wavelength range of the passband of filter element 46 pass through the filter element 46 and through the substrate 43, and then propagate along a path of travel 72. The pivotable support 41, substrates 43-44, filter element 46 and reflective element 66 are equivalent to an arrangement disclosed in U.S. Ser. No. 12/363,527 filed Jan. 30, 2009, the entire disclosure of which is hereby incorporated herein by reference.

The optical filter section 26 also includes a further gear 81 supported for limited rotational movement about an axis 82 that is spaced from and parallel to the axis 34. The gear 81 has a diameter substantially equal to that of the gear 33, and has teeth that engage the teeth on gear 33. Thus, when the gear 33 is pivoted, it pivots the gear 81 through an equal but opposite angular movement. A compensating element 86 is fixedly supported on the gear 81 for pivotal movement therewith, at a location so that the path of travel 72 extends through the compensating element. The compensating element 86 is made of the same material and has the same thickness as the substrate 43. The compensating element 86 is oriented so that the facing surfaces of the substrate 43 and compensating element 86 form equal but opposite angles with respect to the path of travel 72. The compensating element 86 realigns radiation propagating along the path 72, in order to compensate for any deviation that may be caused by refraction as the beam travels through the substrate 43. After passing through the compensating element 86, the radiation continues along a path of travel 88 to the optical filter section 28.

The optical filter section 28 includes a gear 101 that is supported for limited rotational movement about a pivot axis 102 that is spaced from and parallel to the axes 34 and 82. A drive mechanism 104 is similar to but independent from the drive mechanism 36, and can effect limited pivotal movement of the gear 101 about the axis 102. The gear 101 is shown in a center position in FIG. 1. The drive mechanism 104 can selectively pivot the gear 101 a few degrees away from the illustrated center position about the axis 102, in either of two opposite rotational directions. The drive mechanism 104 can also releasably maintain the gear 101 in any angular position.

A V-shaped support member 108 is fixedly supported on the gear 101 for pivotal movement therewith. Two substrates 111 and 112 each have one end fixedly but detachably coupled to a respective leg of the V-shaped support member 108. The facing surfaces of the substrates 111 and 112 extend at an angle of 45° with respect to each other, and intersect at a line that is coincident with the axis 102. The facing surfaces of the substrates 111 and 112 each have thereon a respective edge filter element 113 or 114. The edge filter elements 113 and 14 are each a multi-layer coating of a known type. The edge filter elements 113 and 114 are discussed in more detail later.

The optical filter section 28 includes a further gear 118 supported for limited rotational movement about an axis 119 that is spaced from and parallel to the axes 34, 82 and 102. The gear 118 has a diameter substantially equal to the diameter of the gear 101, and has teeth that engage the teeth on gear 101. Thus, whenever the gear 101 is pivoted, it pivots the gear 118 through an equal but opposite angular movement. A compensating element 122 is fixedly supported on the gear 118 for pivotal movement therewith. The compensating element 122 is made of the same material as the substrate 111, and has the same thickness as the substrate 111. The substrate 111, the substrate 112 and the compensating element 122 are each transmissive to all radiation within the operating range of the filter 12.

The compensating element 122 is positioned so that radiation propagating along the path of travel 88 will pass through the compensating element 122, and then continue along a path of travel 126. The facing surfaces of the compensating element 122 and the substrate 111 are oriented so that they form equal but opposite angles with respect to the path of travel 126. The compensating element 122 realigns beams of radiation that pass through it, in order to compensate for any deviation or offset that may possibly be induced into the radiation by refraction as the beam travels through the substrate 111. The compensating elements 86 and 122 and the associated gears 81 and 118 are optional, but are included in the apparatus 10 of FIG. 1 for enhanced beam alignment.

Figure 4:
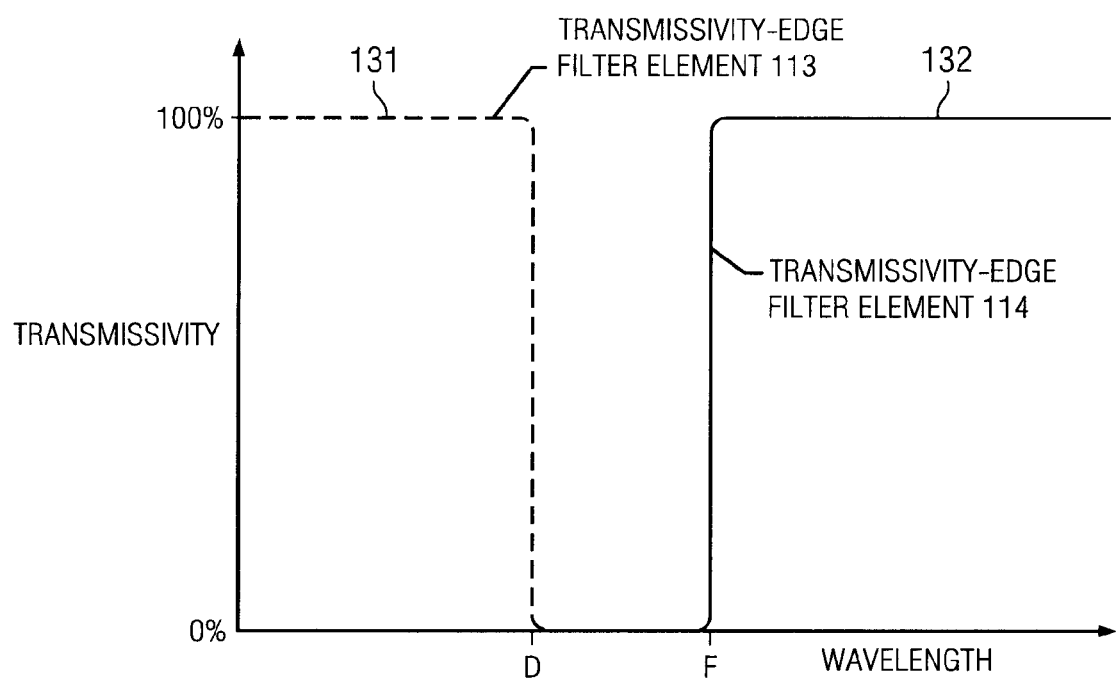
FIG. 4 is a graph depicting a broken line curve representing the transmission characteristic of one edge filter element and a solid line curve representing the transmission characteristic of another edge filter element, where the edge filter elements are both components of the embodiment of FIG. 1.
Figure 5:
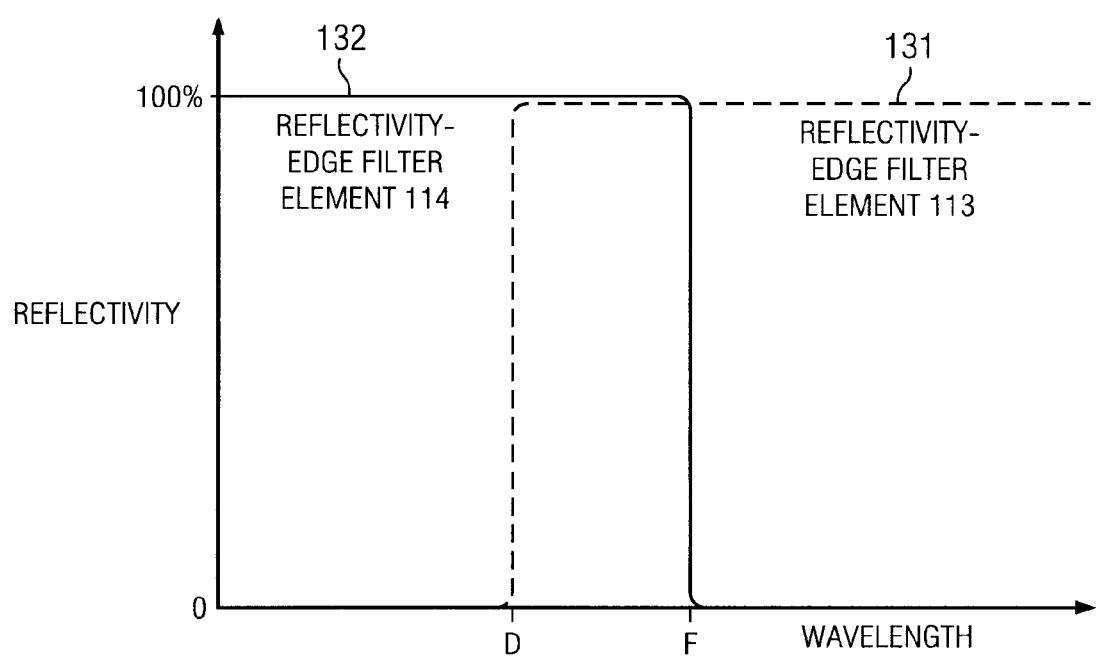
FIG. 5 is a graph that is similar to FIG. 4 but that shows the same two curves 131 and 132 from the perspective of the reflection characteristic rather than the transmission characteristic of each.

FIG. 4 is a graph depicting a broken line curve 131 that represents the transmission characteristic of the edge filter element 113, and also depicting a solid line curve 132 that represents the transmission characteristic of the edge filter element 114, when the gear 101 is in the center position shown in FIG. 1. FIG. 5 is a graph that is similar to FIG. 4 except that it shows the same two curves 131 and 132 from the perspective of reflection rather than transmission. In other words, in FIG. 5 the broken line curve 131 represents the reflection characteristic of the edge filter element 113, and the solid line curve 132 represents the transmission characteristic of the edge filter element 114, when the gear 101 is in the center position shown in FIG. 1. For clarity, the curves 131 and 132 are each shown with a somewhat idealized shape in FIGS. 4 and 5. For the purpose of this discussion, the transmission characteristic in FIG. 4 of each edge filter element 113 and 114 (considered alone) identifies the wavelengths that are transmitted through that edge filter element, and the reflection characteristic in FIG. 5 of each edge filter element identifies the wavelengths that are reflected by that edge filter element.

As evident from the curve 131 in FIGS. 4 and 5, the edge filter element 113 is transmissive and reflective to wavelengths respectively below and above an edge wavelength D. Similarly, as evident from the curve 132 in FIGS. 4 and 5, the edge filter element 114 is reflective and transmissive to wavelengths respectively below and above an edge wavelength F. In the embodiment of FIG. 1, the wavelengths D and F are both significantly longer than the wavelengths A, B and C in FIGS. 2 and 3. The pivotable support 108, substrates 111-112, and filter elements 113-114 are equivalent to an arrangement disclosed in U.S. Ser. No. 12/169,808, filed Jul. 9, 2008, the entire disclosure of which is hereby incorporated herein by reference.

With reference to FIG. 1, radiation from the optical filter section 26 that is propagating along the path 88 will arrive at the optical filter section 28, and will pass successively through the compensating element 122, substrate 111 and edge filter element 113, and then travel along a path of travel 136 to the target 16. This radiation will cause the fluorescent dye in target 16 to fluoresce and emit radiation with a longer wavelength that is approximately halfway between wavelengths D and F. This radiation propagates away from the target 16 along a path of travel 138. In the disclosed embodiment, the path of travel 138 is actually coincident with the path of travel 136 but, for clarity, these paths are shown in FIG. 1 with a slight lateral offset.

When the gear 101 is in the center position shown in FIG. 1, the radiation traveling along path 138 impinges on the edge filter element 113 at an angle of approximately 22.5° with respect to a not-illustrated reference line perpendicular to the edge filter element 113. The portion of this radiation below the wavelength D passes through the edge filter element 113 and the substrate 111, and travels through the compensating elements 122 and 86 and through the substrate 43 to the bandpass filter element 46, where it is reflected because it is outside the passband of the bandpass filter element 46. This reflected radiation then travels to and is absorbed by an optional beam dump 141.

In contrast, radiation that arrives along the path 138 and that is above wavelength D is reflected by the edge filter element 113, and then travels to the edge filter element 114, where it impinges on the edge filter element 114 at an angle of incidence of 22.5° with respect to a not-illustrated reference line perpendicular to the filter element 114. The portion of this radiation that is above wavelength F (FIGS. 4 and 5) passes through the filter element 114 and the substrate 112, and then travels to and is absorbed by an optional beam dump 144. In contrast, radiation that impinges on the edge filter element 114 and that is below wavelength F is reflected by the edge filter element 114 and then propagates along a path of travel 147 through the imaging optics 18 to the detector array 19.

Figure 6:
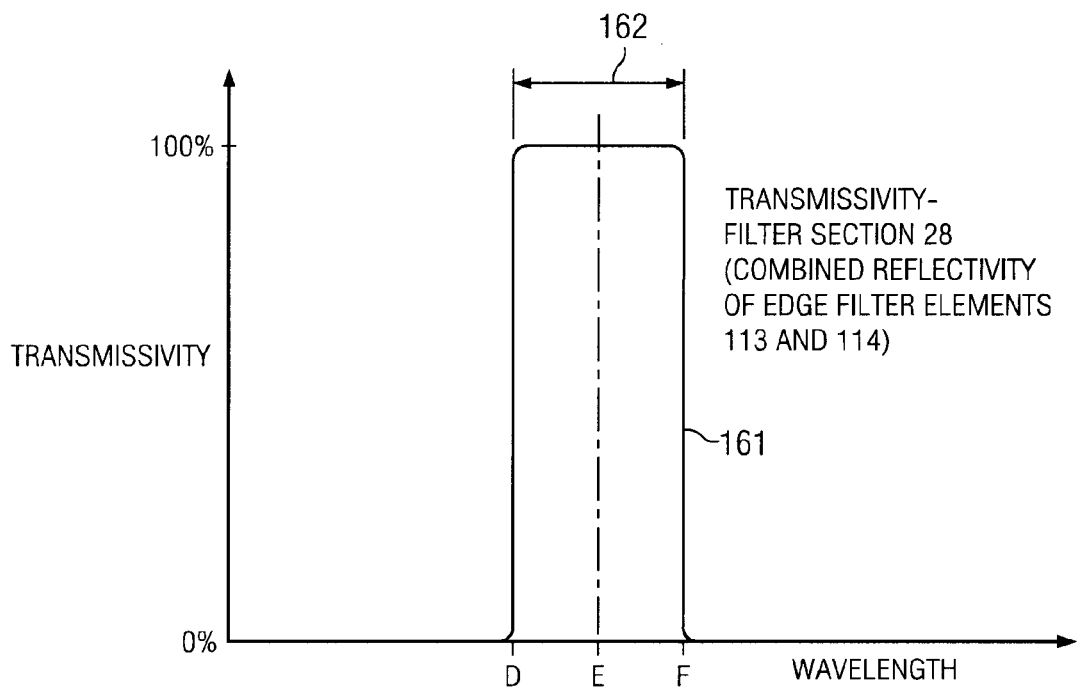
FIG. 6 is a graph showing a curve that represents the transmissivity of a bandpass filter defined by the two edge filter elements.

The edge filter elements 113 and 114, operating together, serve as a bandpass filter as to radiation that arrives on path 138 and departs on path 147, where the passband is between wavelengths D and F when the gear 101 and filter elements 113 and 114 are in the center position shown in FIG. 1. FIG. 6 is a graph showing a curve 161 that represents the transmissivity of the bandpass filter section 28, or in other words the combined reflectivity of the filter elements 113 and 114 with respect to radiation arriving on path 138 and departing on path 147. For clarity, the curve 161 in FIG. 6 has a somewhat idealized shape. When the gear 101 and filter elements 113-114 are in the center position of FIG. 1, the filter elements 113 and 114 together define a passband that is between two wavelengths D and F, and that has a bandwidth 162 and a center wavelength E. Radiation between wavelengths D and F is transmitted through the bandpass filter and exits at 147, whereas radiation outside this passband does not exit at 147 but instead is routed to either the beam dump 141 or the beam dump 144.

Figure 7:
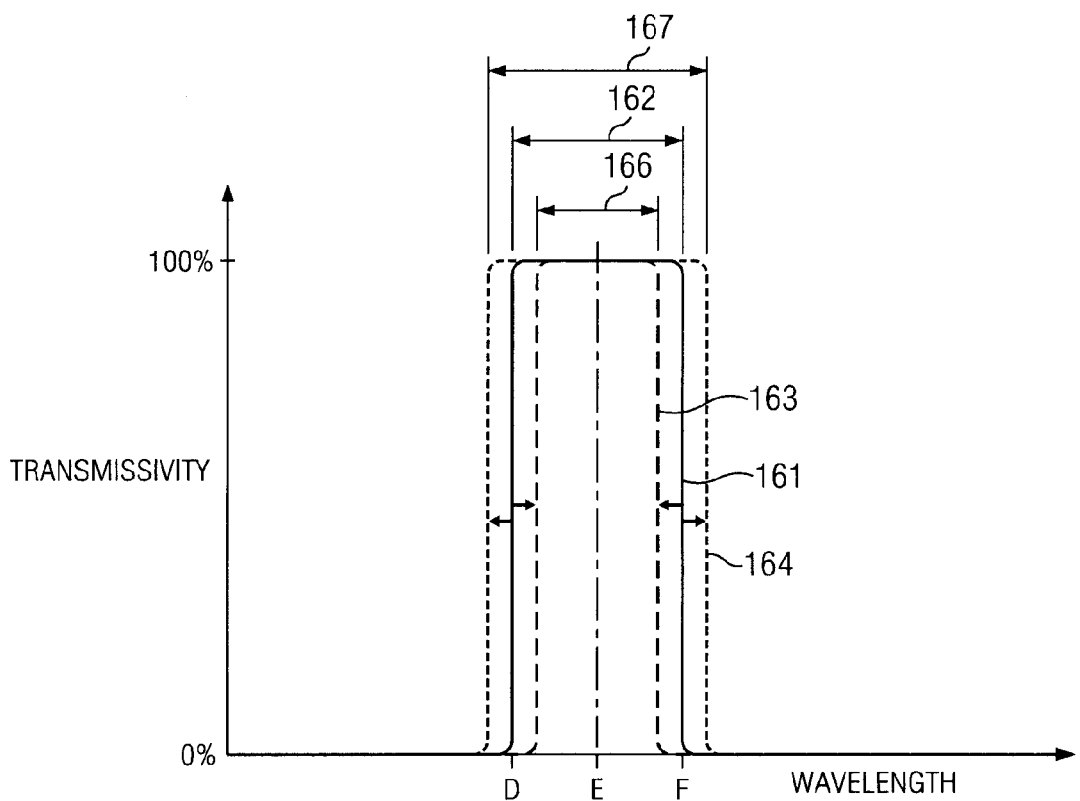
FIG. 7 is a graph similar to FIG. 5 that shows the same curve as FIG. 6, and that also shows the effect on a passband of tilting movement of the two edge filter elements.

If the gear 101 and edge filter elements 113 and 114 are pivoted in either direction away from the center position of FIG. 1 by the drive mechanism 104, the path 147 will not move, but the angles of incidence of radiation impinging on each of the edge filter elements 113 and 114 will change. FIG. 7 is a graph that is similar to FIG. 6 and shows the same curve 161 depicted in FIG. 6, but that also shows the effect on the passband of pivotal movement in either direction away from the center position.

More specifically, if the gear 101 and edge filter elements 113 and 114 are pivoted in one direction away from the center position, the edge wavelength of the filter element 113 will increase from D while the edge wavelength of the filter element 114 will decrease from F, as indicated by a broken-line curve 163 in FIG. 7. In contrast, if the gear 101 and filter elements 113 and 114 are pivoted away from the center position in the opposite direction, the edge wavelength of the filter element 113 will decrease from D and the edge wavelength of the filter element 114 will increase from F, as indicated by a broken-line curve 164 in FIG. 7. Consequently, as shown in FIG. 7, if the gear 101 and filter elements 113 and 114 are pivoted away from the center position in one direction, the bandwidth of the passband will decrease from the bandwidth 162 to a bandwidth 166, whereas if they are pivoted away from the center position in the opposite direction, the bandwidth of the passband will increase from the bandwidth 162 to a bandwidth 167. During pivotal movement of the gear 101 and filter elements 113 and 114 in either direction, the center wavelength E does not change significantly.

Figure 8:
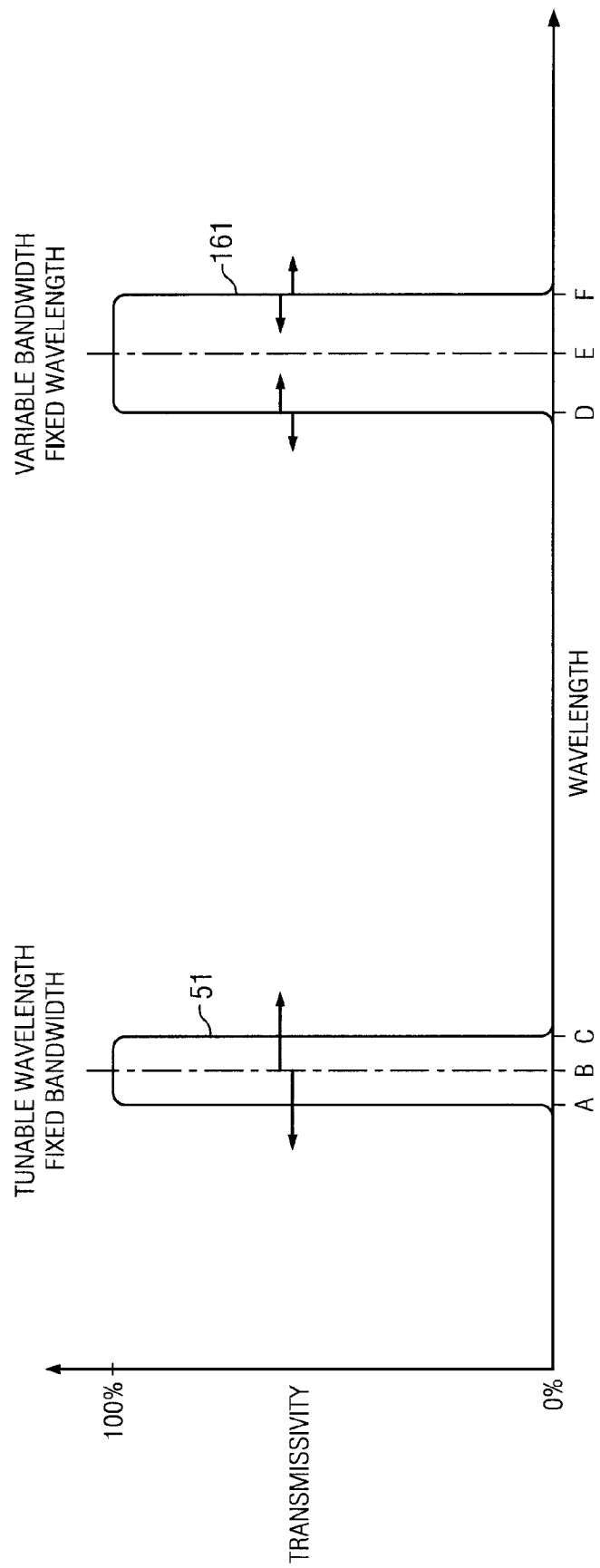
FIG. 8 is a graph showing both passbands of the dual-passband optical filter of FIG. 1.

FIG. 8 is a graph showing both passbands of the dual-passband filter 12 of FIG. 1, including the curve 51 of FIGS. 2-3 involving a passband with a fixed bandwidth and a tunable frequency, and the curve 161 of FIGS. 6-7 involving a passband with a tunable bandwidth and a fixed center wavelength.

Figure 9:
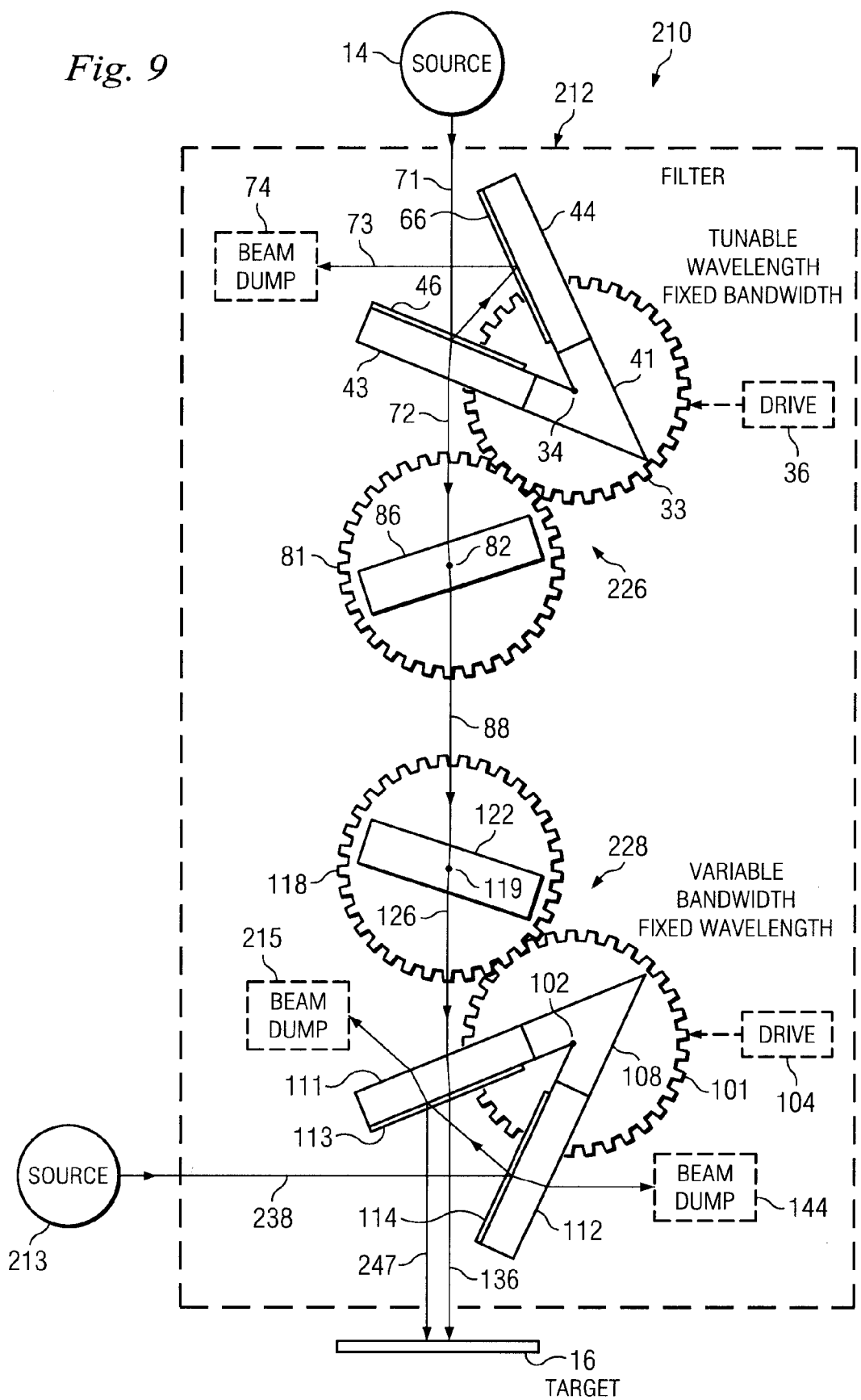
FIG. 9 is a diagrammatic view of an apparatus that is a portion of a fluorescence microscope, and that includes a dual-passband optical filter that is an alternative embodiment of the dual-passband optical filter of FIG. 1.

FIG. 9 is a diagrammatic view of an apparatus 210 that is a portion of a fluorescence microscope, and that is an alternative embodiment of the apparatus 10 of FIG. 1. Components in FIG. 9 that are similar or identical to components in FIG. 1 are identified in FIG. 8 with the same reference numerals used in FIG. 1. The following discussion focuses primarily on differences between the embodiments of FIGS. 1 and 8.

The imaging optics 18 and detector array 19 of FIG. 1 have been replaced with a source 213 in the embodiment of FIG. 9. The source 213 is a known device that emits a broadband beam within a selected waveband. In the disclosed embodiment, the source 213 is essentially identical to the source 14.

In FIG. 9, the dual-passband filter 12 of FIG. 1 has been replaced by a dual-passband filter 212. The filter 212 of FIG. 9 is effectively identical to the filter 12 of FIG. 1, except for differences discussed below. The filter 212 includes an optical filter section 226 that differs from the optical filter section 26 of FIG. 1 only in that the filter section 226 does not include the beam dump 141. The filter 212 also includes an optical filter section 228 that differs from the optical filter section 28 of FIG. 1 only in that the beam dump 144 has been slightly repositioned, and an optional beam dump 215 has been added for radiation that passes through the edge filter element 113 and the substrate 111.

The apparatus 210 of FIG. 9 operates as follows. Radiation emitted by the source 14 enters the filter 212, and is filtered in basically the same manner discussed above in association with the filter 12 of FIG. 1. The resulting filtered radiation exits the filter 212 along the path 136 and impinges on the target 16.

Radiation from the source 213 propagates along a path of travel 238 to the edge filter element 114, where radiation above the wavelength F (FIGS. 4 & 5) passes through the edge filter element 114 and substrate 112, and then travels to and is absorbed by the beam dump 144. In contrast, radiation arriving along the path 238 that is below the wavelength F is reflected and travels to the filter element 113. The portion of this radiation below the wavelength D passes through the filter element 113 and the substrate 111, and then travels to and is absorbed by the beam dump 215. In contrast, radiation that arrives at filter element 113 and is above wavelength D is reflected, and then travels along a path of travel 247 to the target 16. The edge filter elements 113 and 114 together function as a bandpass filter as to radiation arriving at 238 and departing at 247.

The target 16 is thus illuminated by radiation within two different passbands that are each separately and independently controlled by a respective one of the two optical filter sections 226 and 228. This radiation arriving at the target 16 may illuminate and/or cause fluorescence from the target, and radiation emitted by the target 16 as a result of illumination and/or fluorescence can then be collected and imaged in a known manner by known structure that is not shown in FIG. 9.

The radiation beam traveling along path 73 in FIGS. 1 and 9 is a notch that is the inverse of the radiation beam traveling along the path 72. In each of FIGS. 1 and 9, it would be possible to replace the beam dump 74 with the not-illustrated detector of a known spectrometer. The spectrometer could then be used as an optical wavelength monitor that indicates the range of wavelengths currently within the passband of the bandpass filter section 26 or 126. This information could then in turn be used to operate the drive mechanism 36 in order to adjust the rotational position of the gears 33 and 81, and thereby tune the bandpass filter section 26 or 126 so as to change the range of wavelengths falling within the passband.

As evident from the foregoing discussion, the embodiments of FIGS. 1 and 9 are each configured so that the bandpass filter section 26 or 226 with tunable wavelength and fixed bandwidth passes wavelengths that are shorter than the wavelengths passed by the bandpass filter section 28 or 228 with fixed wavelength and variable bandwidth. Alternatively, however, either embodiment could be configured so that the bandpass filter section 28 or 228 with fixed wavelength and variable bandwidth passes wavelengths that are shorter than the wavelengths passed by the bandpass filter section 26 or 226 with tunable wavelength and fixed bandwidth.

In the embodiments of FIGS. 1 and 9, the substrate 44 supports the reflective element 66 that reflects radiation to the beam dump 74. Alternatively, however, the reflective element 66 and the beam dump 74 could be omitted, and the substrate 44 could be made from a material that is absorptive to the wavelengths of radiation reflected by the bandpass filter element 46, so that the substrate 44 serves as a beam dump. This would avoid the expense of the reflective element 66 and the beam dump 74. Similarly, in the embodiments of FIGS. 1 and 9, radiation passing through the edge filter element 114 also passes through the substrate 112 and then travels to the beam dump 144. Alternatively, however, the beam dump 144 could be omitted, and the substrate 112 could be made from a material that is absorptive to the wavelengths of radiation that pass through the edge filter element 114, so that the substrate 112 serves as a beam dump. This would avoid the expense of the beam dump 144.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising an optical filter having first and second pass bands that are different, said optical filter including:
    selectively operable first pass band adjusting structure that varies a characteristic of said first pass band without influencing said second pass band; and
    first and second edge filter elements that are fixedly coupled and supported for simultaneous tilting movement relative to a first path of travel for radiation, said first pass band adjusting structure effecting tilting movement of said edge filter elements relative to said first path of travel, one of said edge filter elements passing and reflecting radiation respectively above and below a first wavelength that is the shortest wavelength within said first pass band, and the other of said edge filter elements reflecting and passing radiation respectively above and below a second wavelength that is the longest wavelength within said first pass band, said first and second wavelengths respectively increasing and decreasing as said edge filter elements are tilted in a first direction, and respectively decreasing and increasing as said edge filter elements are tilted in a second direction opposite said first direction, said edge filter elements being positioned so that radiation within said first pass band that arrives along said first path of travel is reflected successively by said first and second edge filter elements and then departs said second edge filter element along a second path of travel.

2. An apparatus according to claim 1, wherein said first and second pass bands do not overlap in wavelength.

3. An apparatus according to claim 1, wherein said characteristic of said first pass band is one of a center wavelength and a bandwidth.

4. An apparatus according to claim 1, wherein said optical filter includes selectively operable second pass band adjusting structure that varies a characteristic of said second pass band without influencing said first pass band.

5. An apparatus according to claim 4, wherein said characteristic of said first pass band is one of a center wavelength and a bandwidth, and said characteristic of said second pass band is one of a center wavelength and a bandwidth.

6. An apparatus according to claim 4, wherein said characteristic of said first pass band is a center wavelength, and said characteristic of said second pass band is a bandwidth.

7. An apparatus according to claim 6, wherein said first pass band has a bandwidth that is substantially constant, and said second pass band has a center wavelength that is substantially constant.

8. An apparatus comprising an optical filter having first and second pass bands that are different, said optical filter including:
    selectively operable first pass band adjusting structure that varies a characteristic of said first pass band without influencing said second pass band;
    selectively operable second pass band adjusting structure that varies a characteristic of said second pass band without influencing said first pass band;

a bandpass filter element that is supported for tilting movement relative to a first path of travel for radiation, and that has a pass band equivalent to and serving as said first pass band, said first pass band adjusting structure effecting tilting movement of said bandpass filter element relative to said first path of travel, said first pass band having a center wavelength that decreases and increases as said bandpass filter element is respectively tilted in first and second directions that are opposite, said bandpass filter element causing radiation within said first pass band that arrives along said first path of travel to depart said bandpass filter element along a second path of travel, and causing radiation outside said first pass band that arrives along said first path of travel to depart said bandpass filter element along a third path of travel different from said second path of travel; and first and second edge filter elements that are fixedly coupled and supported for simultaneous tilting movement relative to a fourth path of travel for radiation, said second pass band adjusting structure effecting tilting movement of said edge filter elements relative to said fourth path of travel, one of said edge filter elements passing and reflecting radiation respectively above and below a first wavelength that is the shortest wavelength within said second pass band, and the other of said edge filter elements reflecting and passing radiation respectively above and below a second wavelength that is the longest wavelength within second pass band, said first and second wavelengths respectively increasing and decreasing as said edge filter elements are tilted in a third direction, and respectively decreasing and increasing as said edge filter elements are tilted in a fourth direction opposite said third direction, said edge filter elements being positioned so that radiation within said first pass band that departs said bandpass filter element along said second path of travel subsequently passes through one of said first and second edge filter elements and then passes through a reference location, and so that radiation within said second pass band that arrives along said fourth path of travel is reflected successively by said first and second edge filter elements and then departs said second edge filter element along a fifth path of travel.

9. An apparatus according to claim 8, wherein said optical filter includes a compensating element that is tilted by said first pass band adjusting structure in said second and first directions as said bandpass filter element is respectively tilted in said first and second directions, one of said first and second paths of travel extending through said compensating element.

10. An apparatus according to claim 8, wherein said optical filter includes:
a first compensating element that is tilted by said first pass band adjusting structure in said second and first directions as said bandpass filter element is respectively tilted in said first and second directions; and
a second compensating element that is tilted by said second pass band adjusting structure in said fourth and third directions as said edge filter elements are respectively tilted in said third and fourth directions, said first and second compensating elements being positioned so that radiation from said bandpass filter element that is within said first pass band and that reaches said reference location has passed through each of said first and second compensating elements.

11. An apparatus according to claim 8, wherein said one of said edge filter elements is said first edge filter element, radiation within said first pass band that departs said bandpass filter element along said second path of travel passing through said first edge filter element and then traveling away from said first edge filter element along a sixth path of travel parallel to said fourth path of travel.

12. An apparatus according to claim 8, wherein said one of said edge filter elements is said second edge filter element, radiation within said first pass band that departs said bandpass filter element along said second path of travel passing through said second edge filter element and then traveling away from said second edge filter element along a sixth path of travel parallel to said fifth path of travel.

13. An apparatus according to claim 8, wherein one of said filter elements is removably supported in said optical filter.

14. An apparatus according to claim 8, wherein each of said filter elements is removably supported in said optical filter.

15. A method comprising:
filtering radiation with an optical filter having first and second pass bands that are different;
passing and reflecting radiation respectively above and below a first wavelength that is the shortest wavelength within said first pass band with a first edge filter element;
reflecting and passing radiation respectively above and below a second wavelength that is the longest wavelength within said first pass band with a second edge filter element; and
selectively varying a characteristic of said first pass band without influencing said second pass band, including respectively increasing and decreasing said first and second wavelengths by tilting said first and second edge filter elements in a first direction relative to a first path of travel, and respectively decreasing and increasing said first and second wavelengths by tilting said first and second edge filter elements in a second direction opposite said first direction.

16. A method according to claim 15, including selecting one of a center wavelength and a bandwidth as said characteristic of said first pass band.

17. A method according to claim 15, including selectively varying a characteristic of said second pass band without influencing said first pass band.

18. A method according to claim 17, including:
selecting one of a center wavelength and a bandwidth as said characteristic of said first pass band; and
selecting one of a center wavelength and a bandwidth as said characteristic of said second pass band.

19. A method according to claim 17, including:
selecting a center wavelength as said characteristic of said first pass band; and
selecting a bandwidth as said characteristic of said second pass band.

20. A method according to claim 19, including: maintaining a bandwidth of said first pass band substantially constant; and maintaining a center wavelength of said second pass band substantially constant.

* * * * *